United States Patent [19]

Murata et al.

[11] Patent Number: 5,237,272
[45] Date of Patent: Aug. 17, 1993

[54] MAGNETIC CIRCUIT DEVICE FOR A HALL EFFECT TYPE SENSOR FOR DETECTING CRANK ANGLE

[75] Inventors: Shigemi Murata; Yutaka Ohashi, both of Himeji, Japan

[73] Assignee: Mitsubishi Denki K.K., Tokyo, Japan

[21] Appl. No.: 3,849

[22] Filed: Jan. 11, 1993

Related U.S. Application Data

[60] Continuation of Ser. No. 659,431, Feb. 22, 1991, abandoned, which is a continuation of Ser. No. 505,636, Apr. 9, 1990, abandoned, which is a division of Ser. No. 413,648, Sep. 28, 1989, Pat. No. 5,028,868.

[30] Foreign Application Priority Data

Oct. 11, 1988 [JP] Japan .................. 63-131722
Oct. 11, 1988 [JP] Japan .................. 63-131723
Oct. 11, 1988 [JP] Japan .................. 63-131724

[51] Int. Cl.$^5$ ............................ F02P 7/07; G01B 7/30
[52] U.S. Cl. .................... 324/207.2; 123/146.5 A; 324/251
[58] Field of Search ............ 324/150, 151, 173, 174, 324/207.20, 207.21, 207.25, 251, 252; 123/146.5 A, 617; 310/DIG. 3

[56] References Cited

U.S. PATENT DOCUMENTS

| | | | |
|---|---|---|---|
| 3,004,222 | 10/1961 | Knudsen | 324/150 |
| 3,040,253 | 6/1962 | Lender | 324/151 R X |
| 3,464,014 | 8/1969 | Seabury, Jr. | 324/151 R X |
| 4,011,476 | 3/1977 | Beard | 324/179 X |
| 4,105,972 | 8/1978 | Smith | 324/220 |
| 4,165,726 | 8/1979 | Helmer, Jr. | 123/146.5 A |
| 4,235,213 | 11/1980 | Jellissen | 123/146.5 A |
| 4,359,978 | 11/1982 | Brammer et al. | 123/146.5 A |
| 4,550,597 | 11/1985 | Drutchas et al. | 324/207.2 X |
| 4,703,261 | 10/1987 | Berchtold | 324/207.2 |
| 4,853,632 | 8/1989 | Nagano et al. | 324/207.21 |
| 4,859,941 | 8/1989 | Higgs et al. | 324/207.2 |
| 4,874,976 | 10/1989 | Ohsawa et al. | 310/DIG. 3 X |

FOREIGN PATENT DOCUMENTS

2464378 3/1981 France .

*Primary Examiner*—Gerard R. Strecker
*Attorney, Agent, or Firm*—Sughrue Mion Zinn Macpeak & Seas

[57] ABSTRACT

A Hall effect type sensor comprises a magnet and a magnetic flux guide which cooperate to form a magnetic circuit and a Hall IC disposed in the magnetic circuit wherein these elements are fixed to a frame through holding members so that the magnetic flux guide and the Hall IC are placed at correct positions on the frame.

2 Claims, 5 Drawing Sheets

MAGNETIC CIRCUIT DEVICE FOR A HALL EFFECT TYPE SENSOR FOR DETECTING CRANK ANGLE

This is a continuation of application Ser. No. 07/659,431 filed Feb. 22, 1991, now abandoned, which is a continuation of application Ser. No. 07/505,636 filed Apr. 9, 1990, now abandoned, which is a division of application Ser. No. 07/413,648 filed Sep. 28, 1989, now U.S. Pat. No. 5,028,868.

The present invention relates to a Hall effect type sensing device and a magnetic circuit device for a Hall effect type sensor used preferably for detecting a crank angle in an ignition timing control apparatus for an internal combustion engine.

There have been known various types of sensing devices such as a position sensor, an angle sensor, a speed sensor and so on which utilize the Hall effect. Further, a Hall IC formed by integrating and packaging Hall transducing elements used for such sensing devices has also been known. Further, there has been known a Hall effect type sensing device for controlling ignition timing in an internal combustion engine in which the Hall IC and a magnetic circuit device are assembled in a casing or a frame and are fixed by a resinous material.

In the conventional Hall effect type sensing device having the construction described above, it was necessary to use a jig in order to determine the position of the Hall IC and the magnetic circuit elements to the frame, to inject a thermosetting resin under the condition of fixing them, and to cure the resin in a heating furnace. Accordingly, accuracy in determining the positions of the structural elements was poor. It was therefore not suitable for a large scale production, and it was difficult to obtain accurate signals.

In a conventional magnetic circuit device for a Hall effect type sensor in which a magnet is fixed to a magnetic flux guide by an adhesive, it was necessary to use a jig to attach the magnet because the magnetic flux guide had a flat magnet-fitting portion. Even by using the jig, accuracy in determining the position of the magnet was poor, and it was difficult to obtain correct signals in the sensor thus produced.

It is an object of the present invention to provide a Hall effect type sensing device and a magnetic circuit device used for a Hall effect type sensor which facilitate the determination of the correct positions for the structural elements, increase the accuracy to the signals and to facilitate the use of an automated assembling system.

In accordance with the present invention, there is provided a Hall effect type sensing device comprising a magnet and a magnetic flux guide which cooperate to form a magnetic circuit and a Hall IC disposed in the magnetic circuit, the elements being fixed to a frame, characterized in that the frame has at least one holding member for holding the magnetic flux guide and the Hall IC.

In accordance with the present invention, there is provided a Hall effect type sensing device comprising a magnet and a magnetic flux guide which cooperate to form a magnetic circuit and a Hall IC disposed in the magnetic circuit, the elements being fixed to a frame, characterized in that the frame supports a holder which holds at least part of the magnetic flux guide and the Hall IC to determine their positions and which is attached with a plate for covering the Hall IC.

In accordance with the present invention, there is provided a magnetic circuit device for a Hall effect type sensor comprising a magnet for producing a magnetic field to a Hall IC and a magnetic flux guide for supporting the magnet characterized in that the magnetic flux guide has a recess portion and the magnet is firmly attached by bonding to the recess portion.

In drawings:

FIG. 2b is a cross-sectional view taken along a line B—B in FIG. 2a;

FIG. 4b is a cross-sectional view taken along a line C—C in FIG. 4a;

Preferred embodiments of the Hall effect type sensing device of the present invention will be described.

Figure 1:
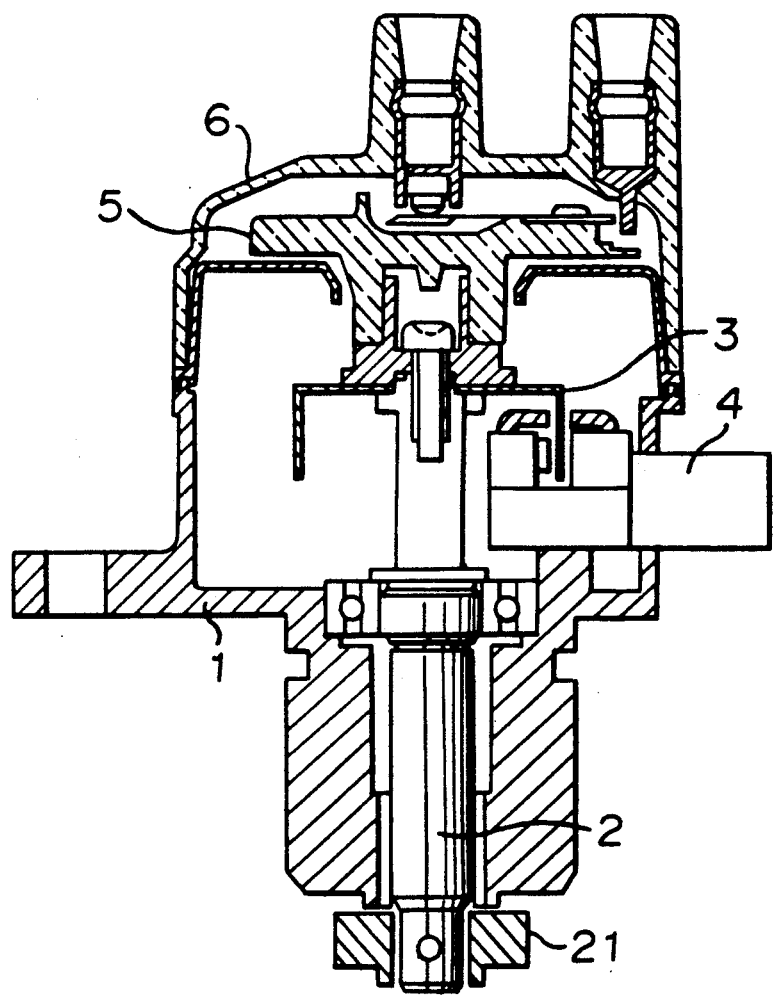
FIG. 1 is a longitudinal cross-sectional view of a distributor in which an embodiment of the Hall effect type sensing device of the present invention is used.

In FIG. 1, a reference number 1 designates a housing as an element of a distributor, and a numeral 2 designates a shaft which is inserted in the central portion of the housing 1 so as to be freely rotatable. the shaft 2 is connected to, for instance, a cam shaft (not shown) in an internal combustion engine through a coupling 21 and is driven in synchronism with the rotation of the engine. A numeral 3 designates a magnetic flux shutter of a magnetic material connected to the shaft 2 so as to be rotatable therewith, a numeral 4 designates a Hall effect type sensing device connected to the housing 1, a numeral 5 designates a rotor for the distributor attached to an end of the shaft 2 so as to be rotatable therewith, and a numeral 6 designates a cap for the distributor.

As shown in FIGS. 2(a)-2(c) and 3, the Hall effect type sensing device 4 comprises a frame 40, a holder 44 for supporting a Hall IC 41, a magnetic flux guide 42a and a plate 43 made of a non-magnetic material such as stainless steel, and another magnetic flux guide 42b and a magnet 45 attached to the magnetic flux guide 42b by means of adhesive.

Figure 2A:
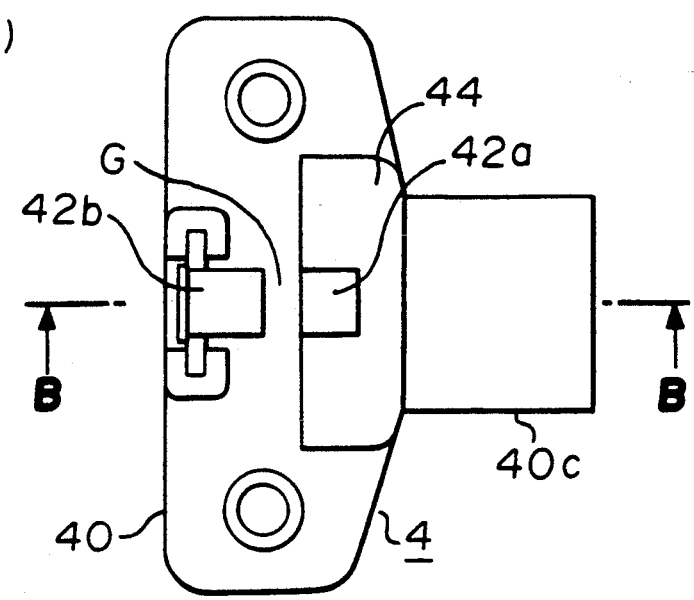
FIG. 2a is a front view of an embodiment of the Hall effect type sensing device as shown in FIG. 1.
Figure 2B:
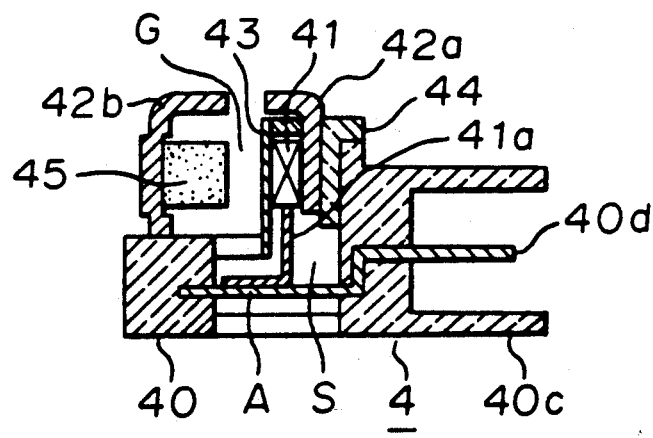
Figure 2C:
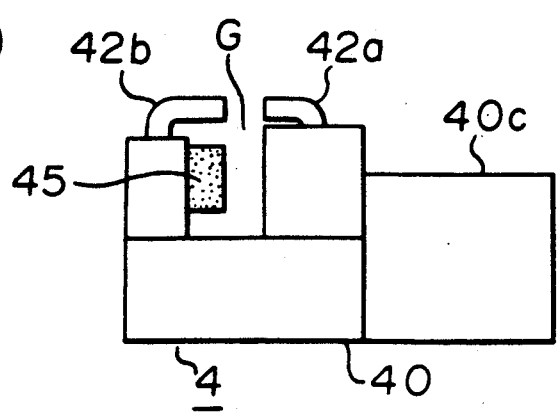
FIG. 2c is a side view of the sensing device as in FIG. 1.
Figure 3:
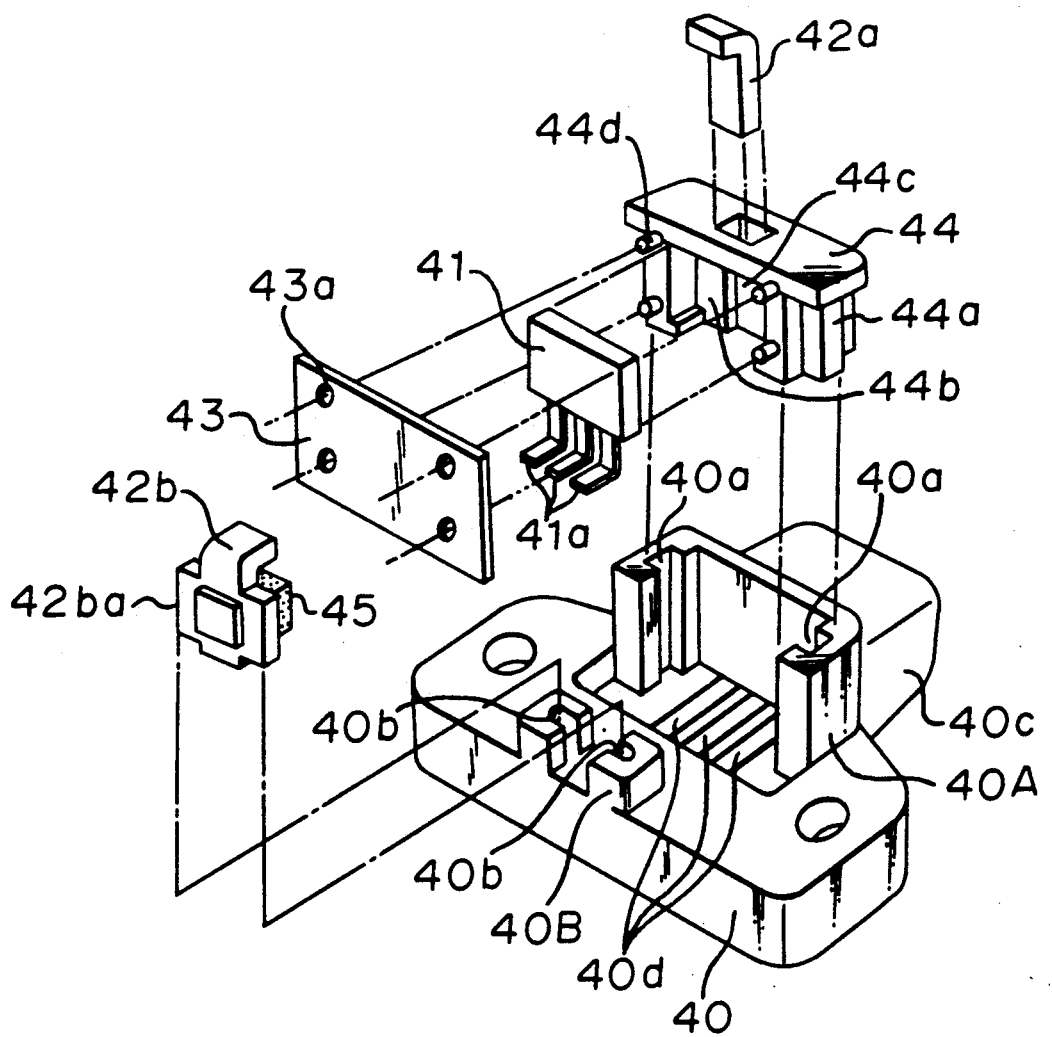
FIG. 3 is a perspective view in a diassembled state of the sensing device as in FIGS. 1 and 2.

The holder 44 is formed of a resinous material by molding and has a second holding block 40A in a generally channel-like form in which a pair of grooves 40a are formed in the vertical direction of the opposing inner side surfaces of the channel-like holding block 40A, a first holding block 40B which consists of two rectangular prism-like pieces each having vertical grooves 40b facing to each other, a connecting portion 40c and connecting conductors 40d, which are integrally formed with the frame 40. An end portion of each of the connecting conductors 40d is exposed in the connecting portion 40c to form a connecting pin so that it is electrically connectable to an outer circuit, and the other end portion of each is connected to each lead wire 41a at an exposing portion A by welding as shown in FIG. 2b.

The holder 44 is also formed by molding a resinous material and has a pair of vertically extending projections 44a to be engaged with the grooves 40a of the frame 40, a first recessed portion 44b for receiving and holding the Hall IC 41, a second recessed portion 44c formed in the first recessed portion 44b so as to extend in the vertical direction so that the magnetic flux guide 42a is received, a four projections 44d extending laterally to support the plate 43.

Plate 43 is provided with through holes 43a to be fitted to the four projections 44d of the holder 44.

The magnetic flux guide 42b is provided with a pair of vertically extending projections 42ba which are to be fitted to the grooves 40b formed in the first holding block 40B of the frame 40.

As shown in FIGS. 2(a)–2(c) and 3, the Hall IC 41, the magnetic flux guide 42a and the plate 43 fitted to the holder 44, and then, the holder 44 is assembled to the frame 40 by fitting the projections 44a to the grooves 40a. The magnetic flux guide 42b is also fitted to the frame 40 by fitting the projections 42ba to the grooves 40b. Thus, assembling of the structural elements of the sensing device is simple, and the positions of the structural elements for constituting a magnetic circuit and the Hall IC 41 can be correctly determined. Then, a gel-like thermosetting resin is injected into a space S around the Hall IC 41. By curing the thermosetting resin, the positional relationship among the structural elements of the Hall effect type sensing device is fixed. No special jig is required as in the conventional sensing device. Further, an automated assembling system can be easily adopted.

Injection of the gel-like thermosetting resin assures that the structural elements are immovable and air-tight, hence the Hall IC 41 is protected from moisture and corrosive gas.

The plate 43 functions as a dam to prevent the resin from overflowing.

A sufficient air gap G is provided between the magnetic flux guides 42a, 42b and between the magnet 45 and the plate 43 so as to pass the magnetic flux shutter 3.

In the Hall effect type sensing device having the construction described above, when the shaft 2 is rotated by actuating the engine, the magnetic flux shutter 3 integrally attached to the shaft 2 is also rotated so as to move in the magnetic circuit including the Hall IC 41. The magnetic flux shutter 3 has its circumferential portion formed in a cascade form although omitted in the figures. Accordingly, a change of magnetic flux depending on the revolution speed of the shaft 2 can be given to the Hall IC 41. The Hall IC 41 converts the change of the magnetic flux into an electric signal corresponding to the revolution of the internal combustion engine, which is taken through the connecting portion 40c. Thus, by processing the output signal of the Hall IC 41 by a processing circuit (not shown), a crank angle is detected, whereby ignition timing can be controlled.

In the above-mentioned embodiment, the positions of the Hall IC 41, the magnetic flux guide 42a and so on to the frame 40 are determined by means of the holder 44. However, these elements may be directly supported by the frame 40 without using the holder 44. The frame 40 may be of a container-like body or may be a container itself. Further, the shape and the number of the holding blocks 40A, 40B, the grooves 40a, 40b and the way of splitting the magnetic flux guides and the position of the magnet are not limited to the above-mentioned embodiment.

Description has been made as to a case wherein an angle of crank is detected to control ignition timing for an internal combustion engine. However, another type of sensing device may be used for the present invention. For instance, the magnetic flux shutter 3 may be of a linearly movable type.

Thus, in accordance with the present invention, a Hall effect type sensing device capable of facilitating position-determining, generating accurate signals and adopting an automatic system can be obtained.

Figure 4A:
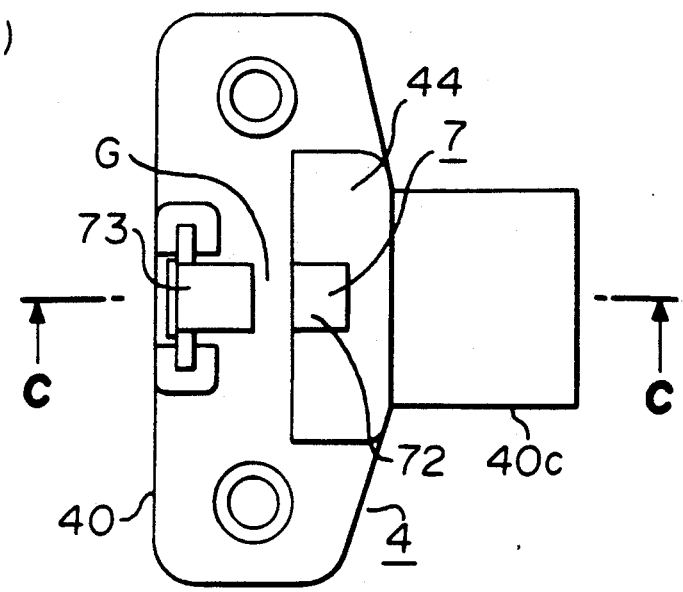
FIG. 4a is a front view of another embodiment of the Hall effect type sensing device of the present invention.
Figure 4B:
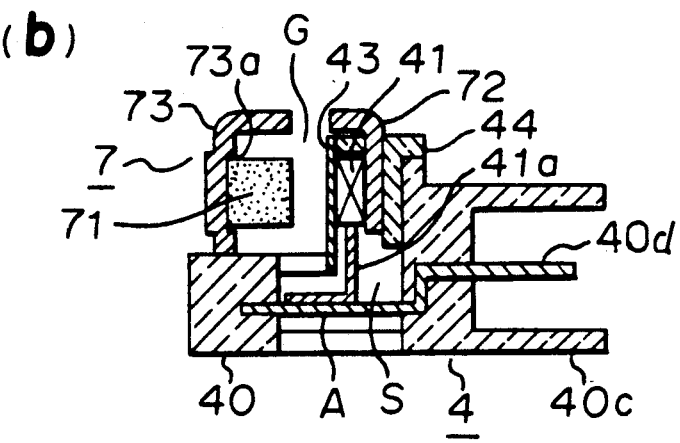
Figure 4C:
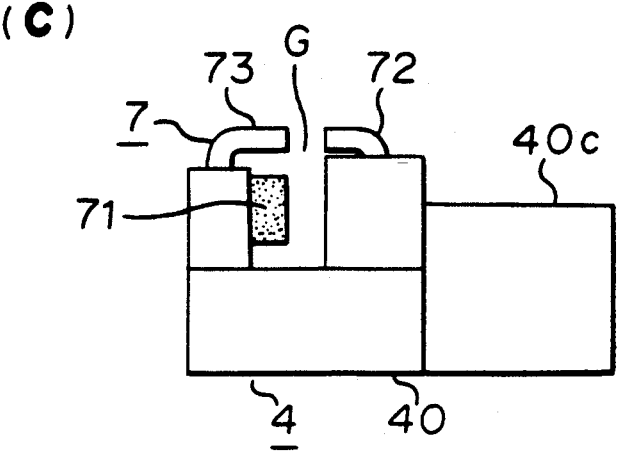
FIG. 4c is a side view thereof.
Figure 5:
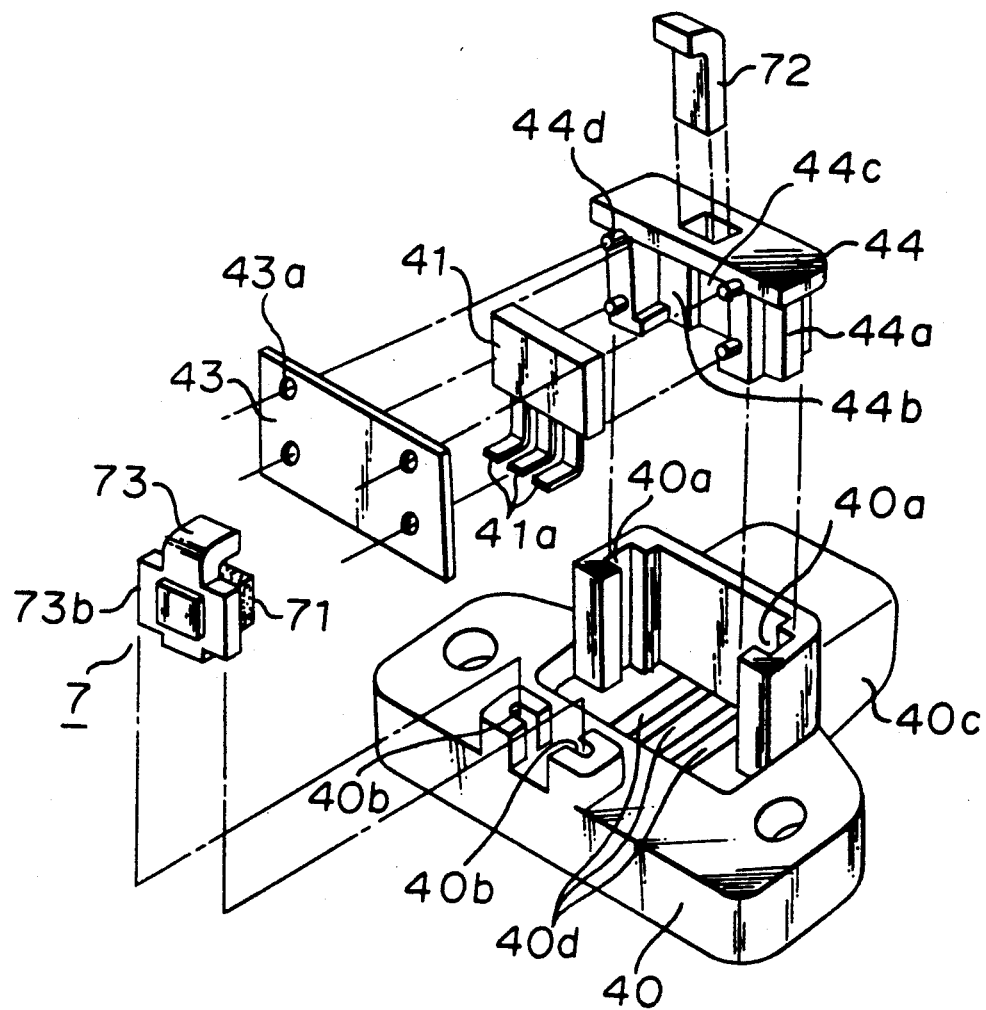
FIG. 5 is a perspective view of the sensing device as in FIG. 4.

FIGS. 4 and 5 show another embodiment of the Hall effect type sensing device according to the present invention. In FIGS. 4 and 5, the same reference numerals designate the same parts as in the first embodiment, and therefore, description of these parts is omitted.

In FIGS. 4(a)–4(c) and 5, a magnetic circuit device 7 comprises a magnet 71, a first magnetic flux guide 72 and a second magnetic flux guide 73. A recess 73a is formed in the second magnetic flux guide 73 so as to determine the position of the magnet 71, and the magnet 71 is firmly connected to the recess 73a by bonding. The first magnetic flux guide 72 is to be received in the recess 44c formed in the holder 44 which is the same as the first embodiment. The second magnetic flux guide 73 is provided with a pair of extensions 73b which are to be fitted to the grooves 40b of the frame 40 which are the same as the first embodiment.

The magnetic circuit device 7 is fitted to the frame 40 by engaging the pair of extensions 73b of the second magnetic flux guide 73 with the pair of grooves 40b of the frame 40 after the magnet 71 has been attached to the recess 73a of the second magnetic flux guide 73 with an adhesive. Further, as shown in FIGS. 4 and 5, the holder 44 is fitted to the frame 40 by engaging the two extensions 44a with the grooves 40a of the holder after the Hall IC 41, the first magnetic flux guide 72 and the plate 43 have been assembled to the holder 44. Thus, the structural elements of the sensing device can be correctly positioned and firmly supported by the frame 40. Then, lead wires 41a are electrically connected to the connecting conductors 40d by, for instance, spot welding. A thermosetting resin is injected in a space S around the Hall IC 41 so that the Hall IC 41 becomes immovable by curing the resin.

Figure 6:
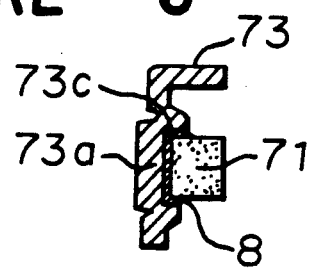
FIG. 6 is a longitudinal cross-sectional view of another embodiment of a part of the sensing device of the present invention.

FIG. 6 is a cross-sectional view of the second magnetic guide 73 and the magnet 71 as another embodiment of the present invention. In this embodiment, the surface area of the bottom wall portion of the recess 73a is made large so that an effective bonding surface to the magnet 71 is increased. And then, an adhesive 8 is applied to the side wall portion 73c as well as the bottom wall portion of the recess 73a. According to this embodiment, the reliability of the position-determining and fixing of the magnet 71 is further improved. It is preferable that the inner surface of the recess 73a has a rough surface in order to strongly bond the magnet 71.

Thus, in accordance with the present invention, the magnet 71 can be easily attached to the magnetic flux guide at a correct position. A Hall effect type sensor capable of providing accurate signals can be obtained Further, an automatic manufacturing system can be easily adopted because the positioning of the structural elements of the sensing device is easy.

We claim:

1. A magnetic circuit device for a Hall effect type sensor, the sensor detecting the crank angle to control ignition timing of an internal combustion engine, the sensor including a Hall IC for converting a change of a magnetic flux into an electric signal, said magnetic circuit device comprising:

- a) a magnet for producing a magnetic field and imparting said magnetic field to the Hall IC;
- b) a first magnetic flux guide mounted on a frame and contacting the Hall IC, the frame including a pair of grooves formed therein; and
- c) a second magnetic flux guide for supporting said magnet, said second magnetic flux guide having a pair of extensions which are fitted into said grooves so as to mount said second magnetic flux guide on the frame at a spaced apart position from said first magnetic flux guide such that an air gap is formed therebetween, the air gap adapted to allow passage of a magnetic flux shutter, said second magnetic flux guide having a recess, said magnet being firmly attached by bonding to said recess, wherein said recess comprises a bottom wall portion and a side wall portion, said bottom wall portion having a large surface area so as to form a large effective bonding surface for said magnet, and further wherein an adhesive is applied to said side wall portion and said bottom wall portion of said recess to thereby bond said magnet to said recess, the magnetic circuit device attendantly increasing the accuracy of the electric signal produced by the sensor during the detection of the crank angle of the internal combustion engine.

2. The magnetic circuit device for a Hall effect type sensor according to claim 1, wherein said bottom wall and side wall portions of said recess are rough.

* * * * *